US012026336B2

(12) United States Patent
Fang et al.

(10) Patent No.: US 12,026,336 B2
(45) Date of Patent: Jul. 2, 2024

(54) TOUCH DISPLAY PANEL AND DISPLAY DEVICE

(71) Applicant: WUHAN CHINA STAR OPTOELECTRONICS SEMICONDUCTOR DISPLAY TECHNOLOGY CO., LTD., Hubei (CN)

(72) Inventors: Liang Fang, Hubei (CN); Ding Ding, Hubei (CN)

(73) Assignee: WUHAN CHINA STAR OPTOELECTRONICS SEMICONDUCTOR DISPLAY TECHNOLOGY CO., LTD., Wuhan Hubei (CN)

(*) Notice: Subject to any disclaimer, the term of this patent is extended or adjusted under 35 U.S.C. 154(b) by 0 days.

(21) Appl. No.: 17/623,219

(22) PCT Filed: Dec. 21, 2021

(86) PCT No.: PCT/CN2021/140228
§ 371 (c)(1),
(2) Date: Dec. 27, 2021

(87) PCT Pub. No.: WO2023/108736
PCT Pub. Date: Jun. 22, 2023

(65) Prior Publication Data
US 2024/0036674 A1 Feb. 1, 2024

(30) Foreign Application Priority Data
Dec. 15, 2021 (CN) .......................... 202111534122.5

(51) Int. Cl.
G06F 3/041 (2006.01)
G06F 3/044 (2006.01)

(52) U.S. Cl.
CPC ........ *G06F 3/04164* (2019.05); *G06F 3/0443* (2019.05); *G06F 3/0446* (2019.05)

(58) Field of Classification Search
CPC .. G06F 3/04164; G06F 3/0446; G06F 3/0443; G06F 3/041; G06F 3/044; G06F 3/0416; G09G 3/20; G09G 3/36
See application file for complete search history.

(56) References Cited

U.S. PATENT DOCUMENTS

| 2019/0155430 | A1* | 5/2019 | Hwang | ................ G06F 3/0448 |
| 2020/0212164 | A1* | 7/2020 | Xie | ................ H10K 59/80515 |
| 2020/0242991 | A1 | 7/2020 | Morita et al. | |

FOREIGN PATENT DOCUMENTS

| CN | 110165069 A | 8/2019 |
| CN | 110888565 A | 3/2020 |
| CN | 113220173 A | 8/2021 |

OTHER PUBLICATIONS

International Search Report in International application No. PCT/CN2021/140228, mailed on Aug. 25, 2022.

(Continued)

Primary Examiner — Michael A Faragalla
(74) Attorney, Agent, or Firm — PV IP PC; Wei Te Chung; Zhigang Ma

(57) ABSTRACT

Disclosed are a touch display panel and a display device, comprising touch wires. The touch wires comprises first sub-parts arranged along the first direction; the first sub-part comprises a first wiring sub-part arranged along the first direction and a first connecting sub-part connecting adjacent first wiring sub-parts. The widths of the two first connecting sub-parts connected to one first wiring sub-part are different, and/or the widths of the two first connecting sub-parts connected between two adjacent first wiring sub-parts are different.

20 Claims, 9 Drawing Sheets

(56) References Cited

OTHER PUBLICATIONS

Written Opinion of the International Search Authority in International application No. PCT/CN2021/140228, mailed on Aug. 25, 2022.

* cited by examiner

TOUCH DISPLAY PANEL AND DISPLAY DEVICE

FIELD OF THE INVENTION

The present application relates to a display technology field, and more particularly to a touch display panel and a display device having the touch display panel.

BACKGROUND OF THE INVENTION

With the rapid development of display technology, touch display technology has gradually spread throughout people's lives. Among the existing touch display panels, compared with resistive touch display panels, capacitive touch display panels possess the advantages of long life, high light transmittance and support for multi-touch, which have become a hot spot in touch display technology.

Capacitive touch display panels can be categorized into self-capacitive touch display panels and mutual-capacitive touch display panels. At present, in a self-capacitive touch display panel, the method of setting leads comprises arranging a metal mesh structure on the same layer as the electrode, and then horizontally and vertically interrupting the metal mesh structure to form horizontal and vertical leads, and each lead is electrically connected to each electrode. However, the interruption method of the metal mesh structure in the related art is oversimplified, resulting in obvious patterning differences between the formed horizontal leads and the formed vertical leads. For example, when light is transmitted through the dividing line formed in the interruption process, the vertical dividing line is just a vertical line, and the horizontal dividing line is just a horizontal line. The two have obvious differences in display brightness, which is prone to phenomenon of uneven display.

SUMMARY OF THE INVENTION

The embodiments of the present application provide a touch display panel and a display device, which can reduce the patterning difference between touch wires arranged in a first direction and touch wires arranged in a second direction, and improve phenomenon of uneven display.

The embodiment of the present application provides a touch display panel, comprising a display area and a non-display area, wherein the touch display panel further comprises:
a substrate;
a light-emitting layer arranged on a side of the substrate and comprising a plurality of light-emitting pixels arranged in the display area;
a touch layer comprising a plurality of touch electrodes arranged in the display area and a plurality of touch wires arranged corresponding to the touch electrodes;
wherein the touch wire comprises a first sub-part arranged along a first direction and a second sub-part arranged along a second direction, the first direction is different from the second direction;
the first sub-part comprises: a plurality of first wiring sub-parts arranged on a side of the light-emitting pixel along the first direction, and a plurality of first connecting sub-parts connecting the adjacent first wiring sub-parts, and widths of the two first connecting sub-parts connected to one of the first wiring sub-parts are different, and/or widths of the two first connecting sub-parts connected between two adjacent first wiring sub-parts are different;

the second sub-part comprises: a plurality of second wiring sub-parts arranged on a side of the light-emitting pixel along the second direction, and a plurality of second connecting sub-parts connecting the adjacent second wiring sub-parts, and widths of the two second connecting sub-parts connected to one of the second wiring sub-parts are different, and/or widths of the two second connecting sub-parts connected between two adjacent second wiring sub-parts are different.

In one embodiment of the present application, in the two adjacent first sub-parts, the first wiring sub-part in one of the first sub-parts and the adjacent first wiring sub-part in the other of the first sub-parts are arranged around the same light-emitting pixel, and widths of the first connecting sub-part in one of the first sub-parts and the adjacent first connecting sub-part in the other of the first sub-parts are different;
or, the first wiring sub-part in one of the first sub-parts is provided with at least two first protruding structures in a direction facing the adjacent first wiring sub-part in the other of the first sub-parts, and widths of two adjacent first protruding structures are different.

In one embodiment of the present application, lengths of the two first protruding structures connected to the same side of the first wiring sub-part are different.

In one embodiment of the present application, a length of the first protruding structure connected to one of the first wiring sub-parts and a length of the first protruding structure connected to the other of the first wiring sub-parts, which are disposed opposite to each other, are different.

In one embodiment of the present application, in the two adjacent first sub-parts, a width of the first wiring sub-part in one of the first sub-parts is the same as a width of the adjacent first wiring sub-part in the other of the first sub-parts.

In one embodiment of the present application, in the two adjacent second sub-parts, the second wiring sub-part in one of the second sub-parts and the adjacent second wiring sub-part in the other of the second sub-parts are arranged around the same light-emitting pixel, and widths of the second connecting sub-part in one of the second sub-parts and the adjacent second connecting sub-part in the other of the second sub-parts are different;
or, the second wiring sub-part in one of the second sub-parts is provided with at least two second protruding structure in a direction facing the adjacent second wiring sub-part in the other of the second sub-parts, and widths of two adjacent second protruding structures are different.

In one embodiment of the present application, lengths of the two second protruding structures connected to the same side of the second wiring sub-part are different.

In one embodiment of the present application, a length of the second protruding structure connected to one of the second wiring sub-part and a length of the second protruding structure connected to the other of the second wiring sub-parts, which are disposed opposite to each other, are different.

In one embodiment of the present application, in the two adjacent second sub-parts, a width of the second wiring sub-part in one of the second sub-parts is the same as a width of the adjacent second wiring sub-part in the other of the second sub-parts.

In one embodiment of the present application, the plurality of touch wires comprise: a first touch wire, a second touch wire and a third touch wire that are adjacently aligned in sequence;

the first wiring sub-part in the second touch wire and the adjacent first wiring sub-part in the first touch wire are arranged around the same light-emitting pixel, and the first wiring sub-part in the second touch wire is provided with at least two first protruding structures in a direction facing the adjacent first wiring sub-part in the third touch wire;

the second wiring sub-part in the second touch wire and the adjacent second wiring sub-part in the first touch wire are arranged around the same light-emitting pixel, and the second wiring sub-part in the second touch wire is provided with at least two second protruding structure in a direction facing the adjacent second wiring sub-part in the third touch wire.

According to the above objective of the present application, the present application provides a display device, wherein the display device comprises a touch display panel, and the touch display panel comprises a display area and a non-display area, and the touch display panel further comprises:

a substrate;
a light-emitting layer arranged on a side of the substrate and comprising a plurality of light-emitting pixels arranged in the display area;
a touch layer comprising a plurality of touch electrodes arranged in the display area and a plurality of touch wires arranged corresponding to the touch electrodes;
wherein the touch wire comprises a first sub-part arranged along a first direction and a second sub-part arranged along a second direction, the first direction is different from the second direction;
the first sub-part comprises: a plurality of first wiring sub-parts arranged on a side of the light-emitting pixel along the first direction, and a plurality of first connecting sub-parts connecting the adjacent first wiring sub-parts, and widths of the two first connecting sub-parts connected to one of the first wiring sub-parts are different, and/or widths of the two first connecting sub-parts connected between two adjacent first wiring sub-parts are different;
the second sub-part comprises: a plurality of second wiring sub-parts arranged on a side of the light-emitting pixel along the second direction, and a plurality of second connecting sub-parts connecting the adjacent second wiring sub-parts, and widths of the two second connecting sub-parts connected to one of the second wiring sub-parts are different, and/or widths of the two second connecting sub-parts connected between two adjacent second wiring sub-parts are different.

In one embodiment of the present application, in the two adjacent first sub-parts, the first wiring sub-part in one of the first sub-parts and the adjacent first wiring sub-part in the other of the first sub-parts are arranged around the same light-emitting pixel, and widths of the first connecting sub-part in one of the first sub-parts and the adjacent first connecting sub-part in the other of the first sub-parts are different;

or, the first wiring sub-part in one of the first sub-parts is provided with at least two first protruding structures in a direction facing the adjacent first wiring sub-part in the other of the first sub-parts, and widths of two adjacent first protruding structures are different.

In one embodiment of the present application, lengths of the two first protruding structures connected to the same side of the first wiring sub-part are different.

In one embodiment of the present application, a length of the first protruding structure connected to one of the first wiring sub-parts and a length of the first protruding structure connected to the other of the first wiring sub-parts, which are disposed opposite to each other, are different.

In one embodiment of the present application, in the two adjacent first sub-parts, a width of the first wiring sub-part in one of the first sub-parts is the same as a width of the adjacent first wiring sub-part in the other of the first sub-parts.

In one embodiment of the present application, in the two adjacent second sub-parts, the second wiring sub-part in one of the second sub-parts and the adjacent second wiring sub-part in the other of the second sub-parts are arranged around the same light-emitting pixel, and widths of the second connecting sub-part in one of the second sub-parts and the adjacent second connecting sub-part in the other of the second sub-parts are different;

or, the second wiring sub-part in one of the second sub-parts is provided with at least two second protruding structure in a direction facing the adjacent second wiring sub-part in the other of the second sub-parts, and widths of two adjacent second protruding structures are different.

In one embodiment of the present application, lengths of the two second protruding structures connected to the same side of the second wiring sub-part are different.

In one embodiment of the present application, a length of the second protruding structure connected to one of the second wiring sub-part and a length of the second protruding structure connected to the other of the second wiring sub-parts, which are disposed opposite to each other, are different.

In one embodiment of the present application, in the two adjacent second sub-parts, a width of the second wiring sub-part in one of the second sub-parts is the same as a width of the adjacent second wiring sub-part in the other of the second sub-parts.

In one embodiment of the present application, the plurality of touch wires comprise: a first touch wire, a second touch wire and a third touch wire that are adjacently aligned in sequence;

the first wiring sub-part in the second touch wire and the adjacent first wiring sub-part in the first touch wire are arranged around the same light-emitting pixel, and the first wiring sub-part in the second touch wire is provided with at least two first protruding structures in a direction facing the adjacent first wiring sub-part in the third touch wire;

the second wiring sub-part in the second touch wire and the adjacent second wiring sub-part in the first touch wire are arranged around the same light-emitting pixel, and the second wiring sub-part in the second touch wire is provided with at least two second protruding structure in a direction facing the adjacent second wiring sub-part in the third touch wire.

Compared with the prior art, in the first sub-part of the present application, the widths of the two first connecting sub-parts connected to one first wiring sub-part are different, and/or the widths of the two first connecting sub-parts connected between two adjacent first wiring sub-parts are different; and in the second sub-part, the widths of the two second connecting sub-parts connected to one second wiring sub-part are different, and/or the widths of the two second connecting sub-parts connected between two adjacent second wiring sub-parts are different. Thus, between two adjacent first sub-parts and between two adjacent second sub-parts, a broken line-shaped partition channel can be formed, so that the partition channels in the first sub-part and the second sub-part possess parts extending in the first direction and the second direction at the same time. Accordingly, the patterning difference between the touch wires arranged along the first direction and the touch wires arranged along the second direction can be reduced, so as to reduce the difference of the touch wires arranged along the first direction and the touch wires arranged along the second direction in the display light transmission process, and improve phenomenon of uneven display of the touch display panel.

BRIEF DESCRIPTION OF THE DRAWINGS

The technical solution and the beneficial effects of the present application are best understood from the following detailed description with reference to the accompanying figures and embodiments.

DETAILED DESCRIPTION OF PREFERRED EMBODIMENTS

Figure 1:
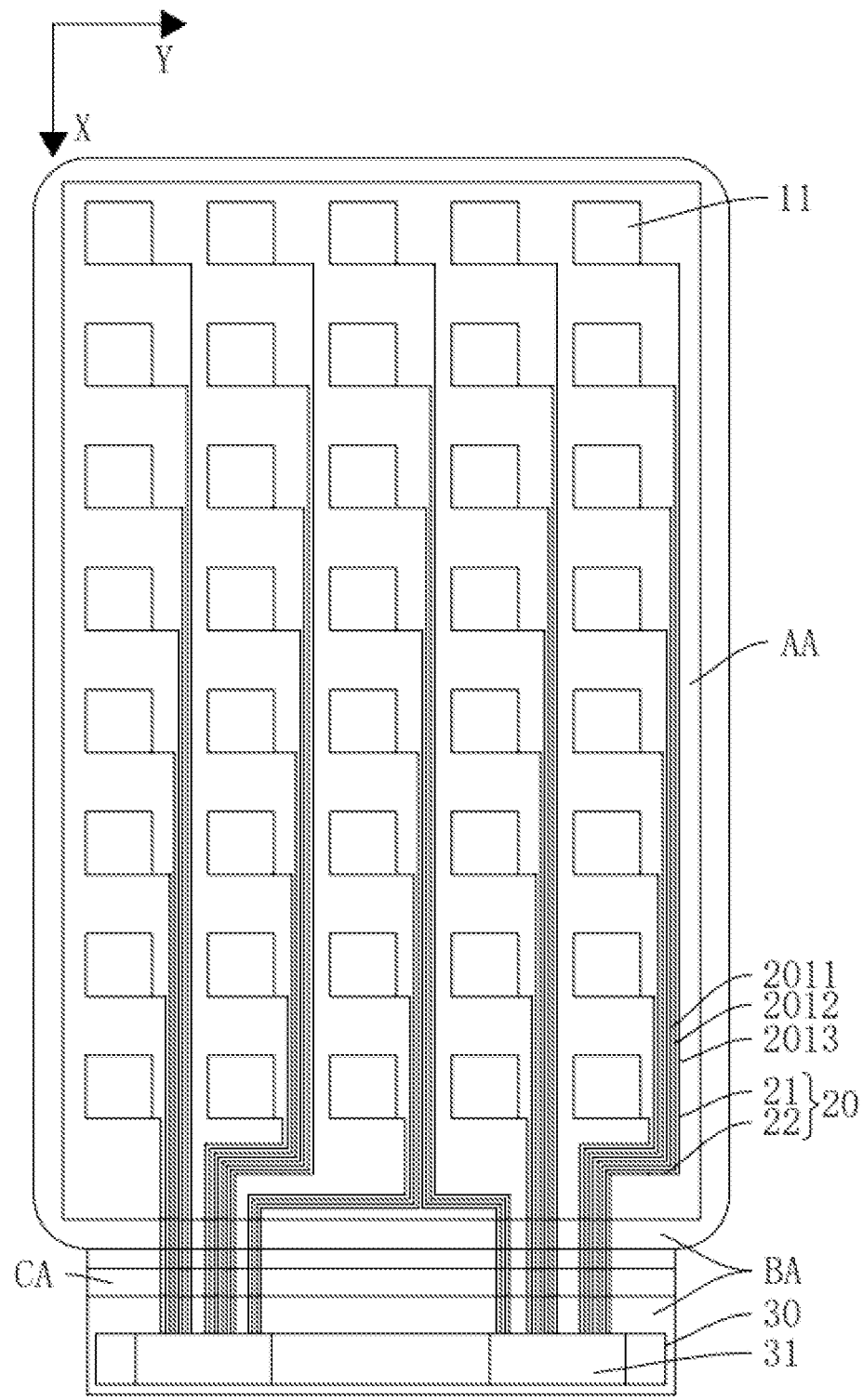
FIG. 1 is a distribution structure diagram of a touch layer in a display panel provided by an embodiment of the application.

For better explaining the technical solution and the effect of the present invention, the present invention will be further described in detail with the accompanying drawings in the specific embodiments. It is clear that the described embodiments are merely part of embodiments of the present application, but not all embodiments. Based on the embodiments of the present application, all other embodiments to those of skilled in the premise of no creative efforts obtained, should be considered within the scope of protection of the present application.

The embodiment of the present application provides a touch display panel. Please refer to FIG. 1, FIG. 2A and FIG. 2B. The touch display panel comprises a substrate, and a light-emitting layer and a touch layer disposed on the substrate. The display panel comprises a display area AA and a non-display area BA.

The light-emitting layer is arranged on a side of the substrate and comprises a plurality of light-emitting pixels 12 arranged in the display area; the touch layer comprises a plurality of touch electrodes 11 arranged in the display area AA and a plurality of touch wires 20 arranged corresponding to the touch electrodes 11.

The touch wire 20 comprises a first sub-part 21 arranged along a first direction X and a second sub-part 22 arranged along a second direction Y, the first direction X is different from the second direction Y.

Furthermore, the first sub-part 21 comprises: a plurality of first wiring sub-parts 211 arranged on a side of the light-emitting pixel 12 along the first direction X, and a plurality of first connecting sub-parts 212 connecting the adjacent first wiring sub-parts 211, and widths of the two first connecting sub-parts 212 connected to one of the first wiring sub-parts 211 are different, and/or widths of the two first connecting sub-parts 212 connected between two adjacent first wiring sub-parts 211 are different. The second sub-part 22 comprises: a plurality of second wiring sub-parts 221 arranged on a side of the light-emitting pixel 12 along the second direction Y, and a plurality of second connecting sub-parts 222 connecting the adjacent second wiring sub-parts 221, and widths of the two second connecting sub-parts 222 connected to one of the second wiring sub-parts 221 are different, and/or widths of the two second connecting sub-parts 222 connected between two adjacent second wiring sub-parts 221 are different.

Figure 3A:
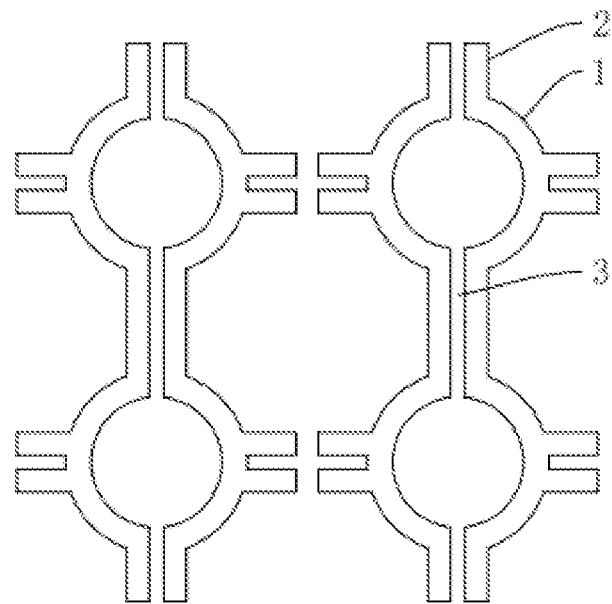
FIG. 3A is a partition structure diagram of the vertical touch wire in the related technology.
Figure 3B:
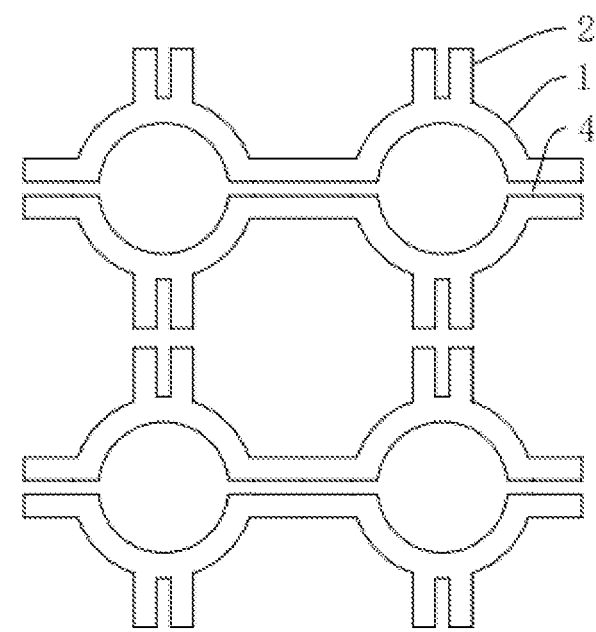
FIG. 3B is a partition structure diagram of the horizontal touch wire in the related technology.

In the implementation and application, please refer to FIG. 3A and FIG. 3B. In the related art, the touch electrode blocks of the touch panel and the touch leads are arranged in the same layer. Specifically, a plurality of connecting units arranged in rows and columns can be arranged in the same layer of the touch electrode block, and each connecting unit comprises an intermediate body 1 and connecting bodies 2 connected around the intermediate body 1. Each intermediate body 1 is connected to the adjacent intermediate body 1 through the connecting bodies 2. Moreover, in the related art, by breaking each intermediate body 1 and the connecting body 2 in the horizontal and vertical directions to form a vertical cut 3 and a horizontal cut 4, a plurality of independent touch leads can be formed, and each touch lead is connected with the touch electrode block to realize the touch function. However, in the related art, both the vertical cut 3 and the horizontal cut 4 are broken in a straight line. The extension direction of the formed cut is oversimplified. In the display process of the touch display panel, the vertical cut 3 transmits light to form a vertical line, and the horizontal cut 4 transmits light to form a horizontal line. As a result, the light transmission brightness of the touch display panel at the vertical cut 3 and the horizontal cut 4 have obvious differences in display brightness, which is prone to phenomenon of uneven display. In the embodiment of the present application, in the first sub-part 21, the widths of the two first connecting sub-parts 212 connected to one first wiring sub-part 211 are different, and/or the widths of the two first connecting sub-parts 212 connected between two adjacent first wiring sub-parts 211 are different; and in the second sub-part 22, the widths of the two second connecting sub-parts 222 connected to one second wiring sub-part 221 are different, and/or the widths of the two second connecting sub-parts 222 connected between two adjacent second wiring sub-parts 221 are different. Thus, between two adjacent first sub-parts 21 and between two adjacent second sub-parts 22, a broken line-shaped partition channel can be formed, so that the partition channels in the first sub-part 21 and the second sub-part 22 possess parts extending in the first direction X and the second direction Y at the same time. Accordingly, the patterning difference between the touch wires arranged along the first direction X and the touch wires arranged along the second direction Y can be reduced, so as to reduce the difference of the touch wires arranged along the first direction X and the touch wires arranged along the second direction Y in the display light transmission process, and improve phenomenon of uneven display of the touch display panel.

Figure 2A:
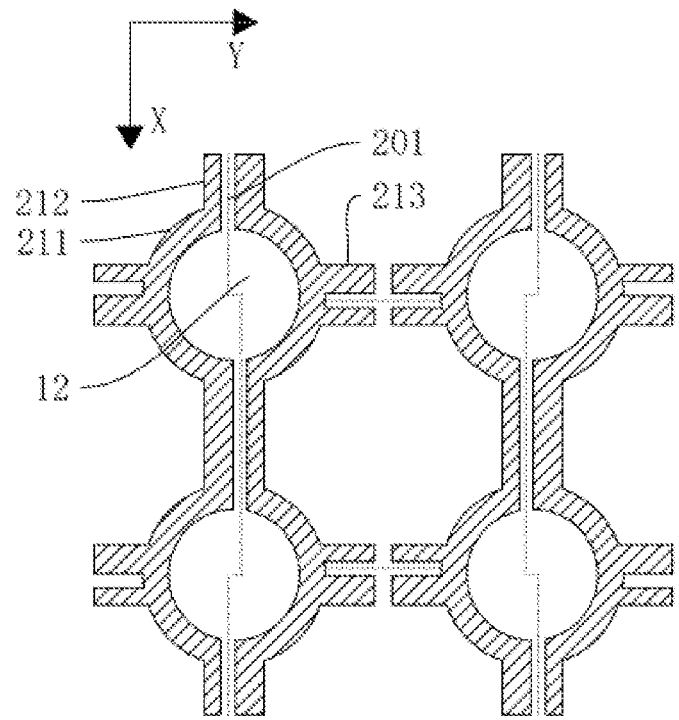
FIG. 2A is a partition structure diagram of a first wiring provided by an embodiment of the application.
Figure 2B:
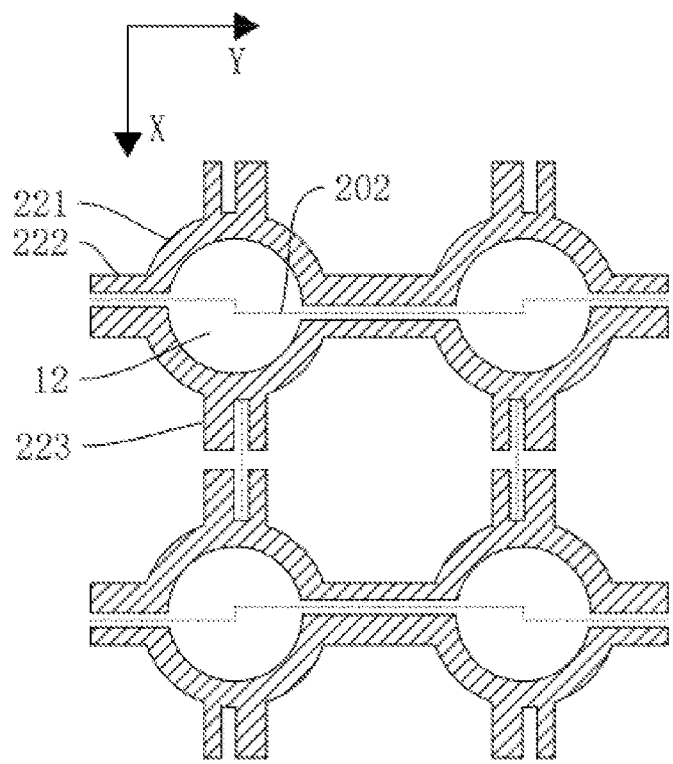
FIG. 2B is a partition structure diagram of a second wiring provided by an embodiment of the application.

Specifically, please continue referring to FIG. 1, FIG. 2A and FIG. 2B. The display panel comprises a display area AA and a non-display area BA. The touch display panel comprises a substrate, and a light-emitting layer and a touch layer disposed on the substrate. It should be noted that the embodiment of the present application only conducts the description of the touch layer provided on the touch display panel. Other display components and film layers arranged on the touch display panel can be implemented with reference to conventional processes; for example, the touch display panel can be a liquid crystal display panel, and the touch display panel comprises an array substrate, a liquid crystal layer and a color filter substrate, and the touch layer can be externally equipped on the array substrate and the color filter substrate, or installed in the array substrate and the color filter substrate; for another example, the touch display panel can also be an organic light emitting diode display panel, and the touch display panel further comprises a thin film transistor layer, a light emitting layer and an encapsulation layer disposed on the substrate, and the touch layer can be disposed on the encapsulation layer or under the encapsulation layer. In addition, the embodiments of the present application only take the above as examples, but are not limited to these, and can be selected according to actual needs. In the embodiment of the present application, the display panel comprises a substrate, a light-emitting layer disposed on the substrate and a touch layer disposed on the light-emitting layer, wherein the display panel further comprises a display area AA and a non-display area BA, and the light-emitting layer comprises a plurality of light-emitting pixels 12 arranged in the display area AA, the touch layer comprises a plurality of touch electrodes 11 arranged in the display area AA and touch wires 20 connected to the respective touch electrodes 11.

The touch layer comprises a plurality of touch electrodes 11 distributed in rows and columns in the display area AA along the first direction X and the second direction Y, and the touch wires 20 with one end extending into the display area AA and connected to the respective touch electrodes 11, and the other end extending into the non-display area BA and connected to the terminal part 30.

Specifically, the terminal part 30 is arranged in the non-display area BA, and a plurality of metal terminals for bonding are arranged in the terminal part 30; the terminal part comprises a touch terminal part 31 for transmitting touch signals, and touch metal terminals for transmitting touch signals are distributed therein.

Furthermore the touch wire 20 comprises a first sub-part 21 arranged along a first direction X and a second sub-part 22 arranged along a second direction Y. The first sub-part 21 comprises a plurality of first wiring sub-parts 211 arranged along the first direction X, and a plurality of first connecting sub-parts 212 connected to both sides of each first wiring sub-part 211 along the first direction X, and two adjacent first wiring sub-parts 211 are connected by two first connecting sub-parts 212. The widths of the two first connecting sub-parts 212 connected to the same first wiring sub-parts 211 are different, and/or the widths of the two first connecting sub-parts 212 connected between two adjacent first wiring sub-parts 211 are different.

Besides, the second sub-part 22 comprises a plurality of second wiring sub-parts 221 arranged along the second direction Y, and a plurality of second connecting sub-parts 222 connected to both sides of each second wiring sub-part 221 along the second direction Y, and two adjacent second wiring sub-parts 221 are connected by two second connecting sub-parts 222. The widths of the two second connecting sub-parts 222 connected to the same second wiring sub-parts 221 are different, and/or the widths of the two second connecting sub-parts 222 connected between two adjacent second wiring sub-parts 221 are different.

Figure 4:
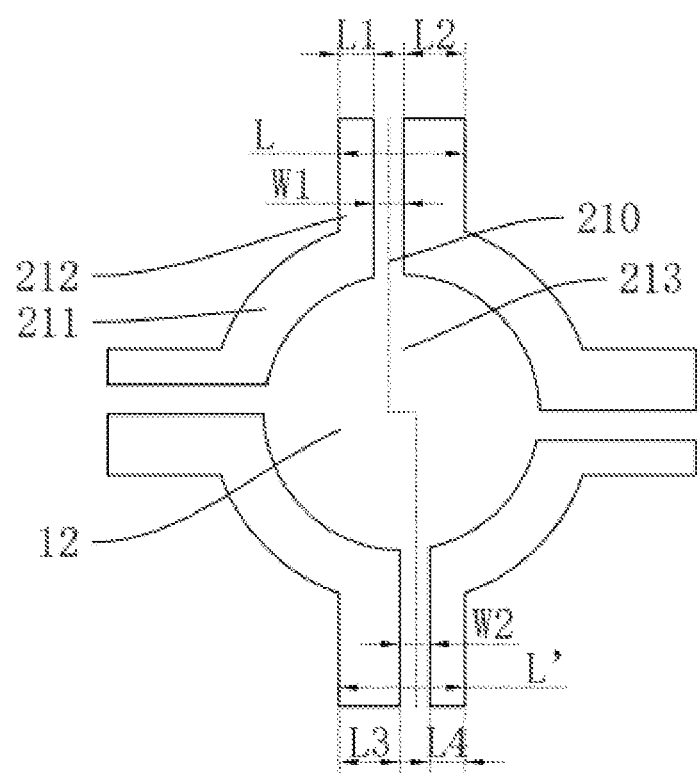
FIG. 4 is a structural diagram of a first wiring provided by an embodiment of the application.

As shown in FIG. 4, the structure in the first sub-part 21 comprises two adjacent first wiring sub-parts 211 and two first connecting sub-parts 212 connected to both sides of each first wiring sub-part 211. In the embodiment of the present application, the width of the first connecting sub-part 212 connected above the first wiring sub-part 211 on the left is L1, and the width of the first connecting sub-part 212 connected below the first wiring sub-part 212 on the left is L3, and the width of the first connecting sub-part 212 connected above the first wiring sub-part 211 on the right is L2, and the width of the first connecting sub-part 212 connected below the first wiring sub-part 211 on the right is L4, wherein L1 can be equal to L4, L2 can be equal to L3; the distance between the two first connecting sub-parts 212 connected above the two first wiring sub-parts 211 is W1, and the distance between the two first connecting sub-parts 212 below the two first wiring sub-parts 211 is W2, wherein W1 can be equal to W2, so that the first partition channel 201 formed by partitioning the two adjacent first sub-parts 21 possesses a broken line shape.

It can be understood that the first sub-part 21 is the touch wire 20 arranged along the first direction X, and the second sub-part 22 is the touch wire 20 arranged along the second direction Y. In the embodiment of the present application, on one hand, the non-display area BA comprises a bending area CA, and the bending area CA is bent to bend the terminal part 30 to the back of the touch display panel to reduce the frame width of the touch display panel; on the other hand, the touch wires 20 arranged along the second direction Y are arranged in the display area AA, so as to save the space in the non-display area BA, so as to further realize a narrow frame display.

In addition, the touch wires 20 are formed by partitioning a plurality of mesh structures as shown in FIG. 2A distributed in the display area AA along the first direction X and the second direction Y. Meanwhile, in the embodiment of the present application, the widths of the connecting sub-parts are differentiated, so that the partition channel of the touch wires 20 is in the shape of a broken line, so as to improve the display uniformity of the display panel.

Specifically, it will be described in detail below in conjunction with specific embodiments. In the embodiments of the present application, only four first sub-parts 21 are shown, and each first sub-part 21 comprises first wiring sub-parts 211 and first connecting sub-parts 212 connected to each first wiring sub-part 211 as an example. Similarly, in the embodiments of the present application, only four second sub-parts 22 are shown, and each second sub-part 22 comprises second wiring sub-parts 221 and second connecting sub-parts 222 connected to each second wiring sub-part 221 as an example.

In one embodiment of the present application, please refer to FIG. 1, FIG. 2A and FIG. 2B. In the first sub-part 21 of this embodiment, the widths of the two first connecting sub-parts 212 connected to the same first wiring sub-parts 211 are different, and the widths of the two first connecting sub-parts 212 connected between two adjacent first wiring sub-parts 211 along the first direction X are the same, so that the first partition channel 201 formed by the two adjacent first sub-parts 21 possesses a broken line shape, so as to improve the display uniformity of the display panel.

Furthermore, from left to right, between the first first sub-part 21 and the second first sub-part 21, the first wiring sub-part 211 of the first first sub-part 21 and the adjacent first wiring sub-part 211 are arranged around one light-emitting pixel 12; between the third first sub-part 21 and the fourth first sub-part 21, the first wiring sub-part 211 of the third first sub-part 21 and the adjacent first wiring sub-part 211 are arranged around one light-emitting pixel 12, thus, in the embodiment of the present application, the touch wires 20 are arranged in the display area AA, but the light emission of the light-emitting pixels 12 is not blocked, that is, the light extraction amount and light extraction effect of the display panel can be improved.

Besides, each first wiring sub-part 211 is provided with a first protruding structure 213 along the second direction Y. For example, between the second first sub-part 21 and the third first sub-part 21, each first wiring sub-part 211 in one of the first sub-parts 21 is provided with two first protruding structure 213 in the direction facing the adjacent other first sub-part 21, and the first protruding structure 213 on the second first sub-part 21 and the first protruding structure 213 on the third first sub-part 21 are spaced apart and disposed opposite to each other.

The widths of the two first protruding structures 213 connected to the same first wiring sub-part 211 and located on the same side are different, and the widths of the two first protruding structures 213 between the two adjacent first wiring sub-parts 211, which are disposed opposite to each other, are the same, and the widths of the two first protruding structures 213 connected to opposite sides of the same first wiring sub-part 211, which are disposed oppositely, are different.

In the second sub-part 22 of this embodiment, the widths of the two second connecting sub-parts 222 connected to the same second wiring sub-parts 221 are different, and the widths of the two second connecting sub-parts 222 connected between two adjacent second wiring sub-parts 221 along the second direction Y are the same, so that the second partition channel 202 formed by the two adjacent second sub-parts 22 possesses a broken line shape, so as to improve the display uniformity of the display panel.

Furthermore, from top to bottom, between the first second sub-part 22 and the second second sub-part 22, the second wiring sub-part 221 of the first second sub-part 22 and the adjacent second wiring sub-part 221 are arranged around one light-emitting pixel 12; between the third second sub-part 22 and the fourth second sub-part 22, the second wiring sub-part 221 of the third second sub-part 22 and the adjacent second wiring sub-part 221 are arranged around one light-emitting pixel 12, thus, in the embodiment of the present application, the touch wires 20 are arranged in the display area AA, but the light emission of the light-emitting pixels 12 is not blocked, that is, the light extraction amount and light extraction effect of the display panel can be improved.

Besides, each second wiring sub-part 221 is provided with a second protruding structure 223 along the second direction Y. For example, between the second second sub-part 22 and the third second sub-part 22, each second wiring sub-part 221 in one of the second sub-parts 22 is provided with two second protruding structure 223 in the direction facing the adjacent other second sub-part 22, and the second protruding structure 223 on the second second sub-part 22 and the second protruding structure 223 on the third second sub-part 22 are spaced apart and disposed opposite to each other.

The widths of the two second protruding structures 223 connected to the same second wiring sub-part 221 and located on the same side are different, and the widths of the two second protruding structures 223 between the two adjacent second wiring sub-parts 221, which are disposed opposite to each other, are the same, and the widths of the two second protruding structures 223 connected to opposite sides of the same second wiring sub-part 221, which are disposed oppositely, are different.

In addition, in the embodiment of the present application, at least one first sub-part 21 is connected to at least one second sub-part 22 to form each touch wire 20 connected to the touch electrode 11. Please refer to FIG. 1 and FIG. 2A, the plurality of touch wires 20 comprise: a first touch wire 2011, a second touch wire 2012 and a third touch wire 2013 that are adjacently aligned in sequence; the first wiring sub-part 211 in the second touch wire 2012 and the adjacent first wiring sub-part 211 in the first touch wire 2011 are arranged around the same light-emitting pixel 12, and the first wiring sub-part 211 in the second touch wire 2012 is provided with at least two first protruding structures 213 in a direction facing the adjacent first wiring sub-part 211 in the third touch wire 2013; the second wiring sub-part 221 in the second touch wire 2012 and the adjacent second wiring sub-part 221 in the first touch wire 2011 are arranged around the same light-emitting pixel 12, and the second wiring sub-part 221 in the second touch wire 2012 is provided with at least two second protruding structure 223 in a direction facing the adjacent second wiring sub-part 221 in the third touch wire 2013.

Specifically, in the embodiment of the present application, the first sub-part 21 may further comprise third wiring sub-parts and third connecting sub-parts connecting two sides of the third wiring sub-part. Meanwhile, the widths of the two third connecting sub-parts connected to both sides of the same third wiring sub-part are equal, or the widths of the two third connecting sub-parts connected between two adjacent third wiring sub-parts are equal to form a linear partition channel; it can be understood that, in order to improve the display uniformity of the display panel and promoting the improvement effect, the number of the first wiring sub-parts 211 in the first sub-part 21 needs to be greater than the number of the third wiring sub-parts. Similarly, the second sub-part 22 may comprise fourth wiring sub-parts and fourth connecting sub-parts connecting two sides of the fourth wiring sub-part. Meanwhile, the widths of the two fourth connecting sub-parts connected to both sides of the same fourth wiring sub-part are equal, or the widths of the two fourth connecting sub-parts connected between two adjacent fourth wiring sub-parts are equal to form a linear partition channel; it can be understood that, in order to improve the display uniformity of the display panel and promoting the improvement effect, the number of the second wiring sub-parts 221 in the second sub-part 22 needs to be greater than the number of the fourth wiring sub-parts.

In addition, in this embodiment, a broken line-shaped first partition channel 201 may be formed between adjacent first sub-parts 21, and a broken line-shaped second partition channel 202 may be formed between adjacent second sub-parts 22. Accordingly, as forming the first sub-parts 21 along the first direction X and forming the second sub-parts 22 along the second direction Y, not only the vertical light transmits, but also the horizontal light transmits, to reduce the light transmittance difference between the vertical direction and the horizontal direction of the touch display panel when the touch wires 20 are patterned, thereby effectively improving the phenomenon of uneven display of the touch display panel and the display effect of the touch display panel.

Figure 5A:
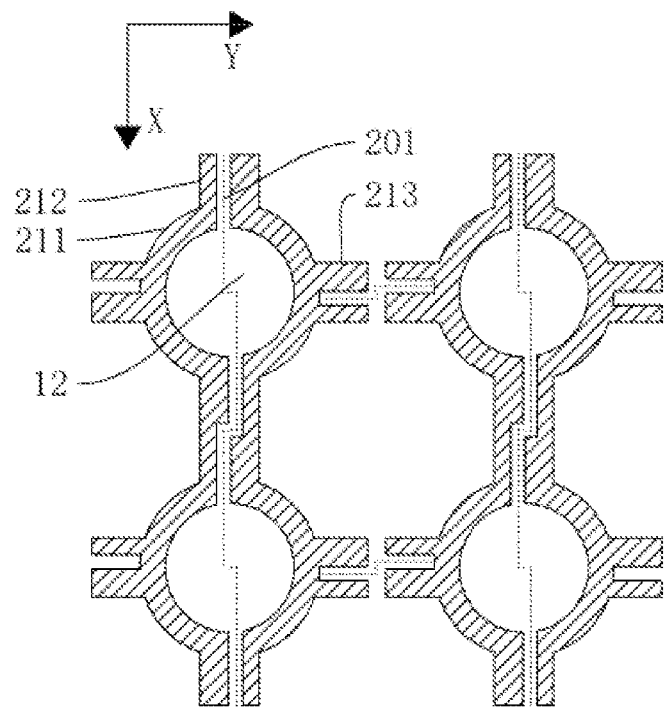
FIG. 5A is a partition structure diagram of another first wiring provided by an embodiment of the application.
Figure 5B:
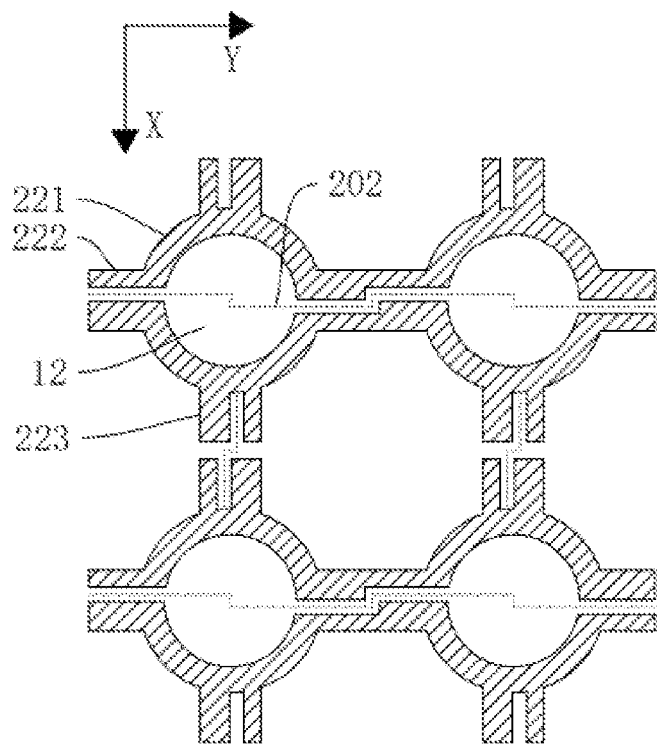
FIG. 5B is a partition structure diagram of another second wiring provided by an embodiment of the application.

Please continue referring to FIG. 1, FIG. 5A and FIG. 5B. In another embodiment of the present application, in the first sub-part 21 of this embodiment, the widths of the two first connecting sub-parts 212 connected to the same first wiring sub-parts 211 are different, and the widths of the two first connecting sub-parts 212 connected between two adjacent first wiring sub-parts 211 along the first direction X are also different, so that the first partition channel 201 formed by the two adjacent first sub-parts 21 possesses a broken line shape, so as to improve the display uniformity of the display panel.

Furthermore, from left to right, between the first first sub-part 21 and the second first sub-part 21, the first wiring sub-part 211 of the first first sub-part 21 and the adjacent first wiring sub-part 211 are arranged around one light-emitting pixel 12; between the third first sub-part 21 and the fourth first sub-part 21, the first wiring sub-part 211 of the third first sub-part 21 and the adjacent first wiring sub-part 211 are arranged around one light-emitting pixel 12, thus, in the embodiment of the present application, the touch wires 20 are arranged in the display area AA, but the light emission of the light-emitting pixels 12 is not blocked, that is, the light extraction amount and light extraction effect of the display panel can be improved.

Besides, each first wiring sub-part 211 is provided with a first protruding structure 213 along the second direction Y. For example, between the second first sub-part 21 and the third first sub-part 21, each first wiring sub-part 211 in one of the first sub-parts 21 is provided with two first protruding structure 213 in the direction facing the adjacent other first sub-part 21, and the first protruding structure 213 on the second first sub-part 21 and the first protruding structure 213 on the third first sub-part 21 are spaced apart and disposed opposite to each other.

The widths of the two first protruding structures 213 connected to the same first wiring sub-part 211 and located on the same side are different, and the widths of the two first protruding structures 213 between the two adjacent first wiring sub-parts 211, which are disposed opposite to each other, are different, and the widths of the two first protruding structures 213 connected to opposite sides of the same first wiring sub-part 211, which are disposed oppositely, are different.

In the second sub-part 22 of this embodiment, the widths of the two second connecting sub-parts 222 connected to the same second wiring sub-parts 221 are different, and the widths of the two second connecting sub-parts 222 connected between two adjacent second wiring sub-parts 221 along the second direction Y are different, so that the second partition channel 202 formed by the two adjacent second sub-parts 22 possesses a broken line shape, so as to improve the display uniformity of the display panel.

Furthermore, from top to bottom, between the first second sub-part 22 and the second second sub-part 22, the second wiring sub-part 221 of the first second sub-part 22 and the adjacent second wiring sub-part 221 are arranged around one light-emitting pixel 12; between the third second sub-part 22 and the fourth second sub-part 22, the second wiring sub-part 221 of the third second sub-part 22 and the adjacent second wiring sub-part 221 are arranged around one light-emitting pixel 12, thus, in the embodiment of the present application, the touch wires 20 are arranged in the display area AA, but the light emission of the light-emitting pixels 12 is not blocked, that is, the light extraction amount and light extraction effect of the display panel can be improved.

Besides, each second wiring sub-part 221 is provided with a second protruding structure 223 along the second direction Y. For example, between the second second sub-part 22 and the third second sub-part 22, each second wiring sub-part 221 in one of the second sub-parts 22 is provided with two second protruding structure 223 in the direction facing the adjacent other second sub-part 22, and the second protruding structure 223 on the second second sub-part 22 and the second protruding structure 223 on the third second sub-part 22 are spaced apart and disposed opposite to each other.

The widths of the two second protruding structures 223 connected to the same second wiring sub-part 221 and located on the same side are different, and the widths of the two second protruding structures 223 between the two adjacent second wiring sub-parts 221, which are disposed opposite to each other, are the same, and the widths of the two second protruding structures 223 connected to opposite sides of the same second wiring sub-part 221, which are disposed oppositely, are different.

In addition, in this embodiment, a broken line-shaped first partition channel 201 may be formed between adjacent first sub-parts 21, and a broken line-shaped second partition channel 202 may be formed between adjacent second sub-parts 22. Accordingly, as forming the first sub-parts 21 along the first direction X and forming the second sub-parts 22 along the second direction Y, not only the vertical light transmits, but also the horizontal light transmits, to reduce the light transmittance difference between the vertical direction and the horizontal direction of the touch touch display panel.

Figure 6A:
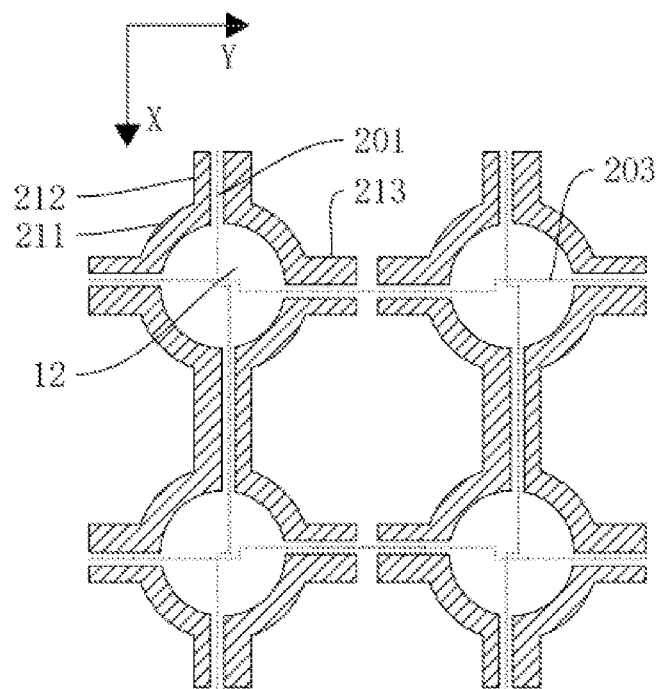
FIG. 6A is a partition structure diagram of one another first wiring provided by an embodiment of the application.
Figure 6B:
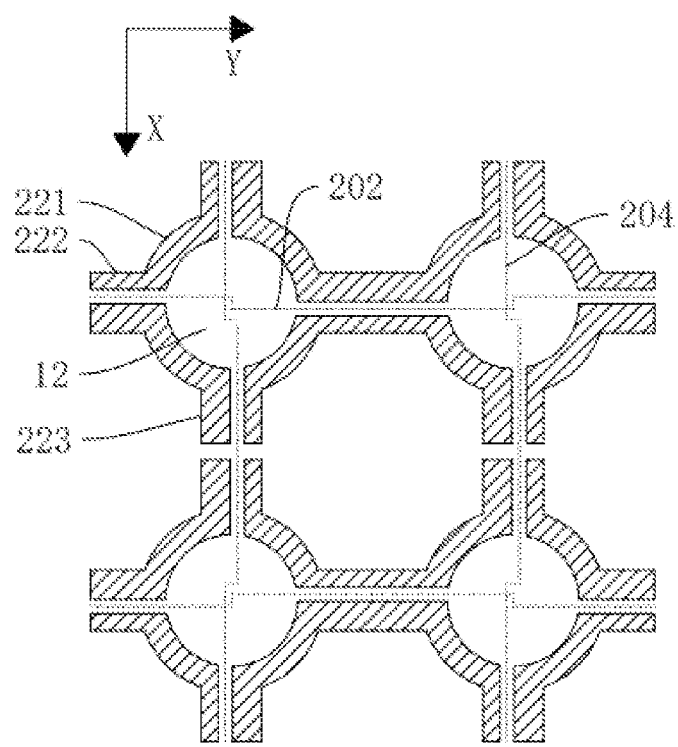
FIG. 6B is a partition structure diagram of one another second wiring provided by an embodiment of the application.

Please refer to FIG. 1, FIG. 6A and FIG. 6B. In another embodiment of the present application, in the first sub-part 21 of this embodiment, the widths of the two first connecting sub-parts 212 connected to the same first wiring sub-parts 211 are different, and the widths of the two first connecting sub-parts 212 connected between two adjacent first wiring sub-parts 211 along the first direction X are the same, so that the first partition channel 201 formed by the two adjacent first sub-parts 21 possesses a broken line shape, so as to improve the display uniformity of the display panel.

Furthermore, from left to right, between the first first sub-part 21 and the second first sub-part 21, the first wiring sub-part 211 of the first first sub-part 21 and the adjacent first wiring sub-part 211 are arranged around one light-emitting pixel 12; between the third first sub-part 21 and the fourth first sub-part 21, the first wiring sub-part 211 of the third first sub-part 21 and the adjacent first wiring sub-part 211 are arranged around one light-emitting pixel 12, thus, in the embodiment of the present application, the touch wires 20 are arranged in the display area AA, but the light emission of the light-emitting pixels 12 is not blocked, that is, the light extraction amount and light extraction effect of the display panel can be improved.

Besides, each first wiring sub-part 211 is provided with a first protruding structure 213 along the second direction Y. For example, between the second first sub-part 21 and the third first sub-part 21, each first wiring sub-part 211 in one of the first sub-parts 21 is provided with two first protruding structure 213 in the direction facing the adjacent other first sub-part 21, and the first protruding structure 213 on the second first sub-part 21 and the first protruding structure 213 on the third first sub-part 21 are spaced apart and disposed opposite to each other.

The widths of the two first protruding structures 213 connected to the same first wiring sub-part 211 and located on the same side are different, and the widths of the two first protruding structures 213 between the two adjacent first wiring sub-parts 211, which are disposed opposite to each other, are the same, and the widths of the sub-part 211, which are disposed oppositely, are different.

In this embodiment, each first wiring sub-part 211 is provided with a third partition channel 203 along the second direction Y. The third partition channel 203 is provided between the two first protruding structures 213 on the same side of the first wiring sub-part 211 to separate the first sub-part 21 into multiple sections arranged along the first direction X, to form a signal wiring connected to the touch electrode 11 and a virtual wiring spaced apart from the signal wiring in the touch wires 20. The virtual wiring and the signal wiring possess the same structure, and thus can have the same light transmission during the display process, so as to improve the uniformity of light transmission of the display panel in each touch wire 20 and improve the display uniformity of the display panel.

In the second sub-part 22 of this embodiment, the widths of the two second connecting sub-parts 222 connected to the same second wiring sub-parts 221 are different, and the widths of the two second connecting sub-parts 222 connected between two adjacent second wiring sub-parts 221 along the second direction Y are the same, so that the second partition channel 202 formed by the two adjacent second sub-parts 22 possesses a broken line shape, so as to improve the display uniformity of the display panel.

Furthermore, from top to bottom, between the first second sub-part 22 and the second second sub-part 22, the second wiring sub-part 221 of the first second sub-part 22 and the adjacent second wiring sub-part 221 are arranged around one light-emitting pixel 12; between the third second sub-part 22 and the fourth second sub-part 22, the second wiring sub-part 221 of the third second sub-part 22 and the adjacent second wiring sub-part 221 are arranged around one light-emitting pixel 12, thus, in the embodiment of the present application, the touch wires 20 are arranged in the display area AA, but the light emission of the light-emitting pixels 12 is not blocked, that is, the light extraction amount and light extraction effect of the display panel can be improved.

Besides, each second wiring sub-part 221 is provided with a second protruding structure 223 along the second direction Y. For example, between the second second sub-part 22 and the third second sub-part 22, each second wiring sub-part 221 in one of the second sub-parts 22 is provided with two second protruding structure 223 in the direction facing the adjacent other second sub-part 22, and the second protruding structure 223 on the second second sub-part 22 and the second protruding structure 223 on the third second sub-part 22 are spaced apart and disposed opposite to each other.

The widths of the two second protruding structures 223 connected to the same second wiring sub-part 221 and located on the same side are different, and the widths of the two second protruding structures 223 between the two adjacent second wiring sub-parts 221, which are disposed opposite to each other, are the same, and the widths of the two second protruding structures 223 connected to opposite sides of the same second wiring sub-part 221, which are disposed oppositely, are different.

In this embodiment, each second wiring sub-part 221 is provided with a fourth partition channel 204 along the first direction X. The fourth partition channel 204 is provided between the two second protruding structures 223 on the same side of the second wiring sub-part 221 to separate the second sub-part 22 into multiple sections arranged along the second direction Y, to form a signal wiring connected to the touch electrode 11 and a virtual wiring spaced apart from the signal wiring in the touch wires 20. The virtual wiring and the signal wiring possess the same structure, and thus can have the same light transmission during the display process, so as to improve the uniformity of light transmission of the display panel in each touch wire 20 and improve the display uniformity of the display panel.

In addition, in this embodiment, a broken line-shaped first partition channel 201 may be formed between adjacent first sub-parts 21, and a broken line-shaped second partition channel 202 may be formed between adjacent second sub-parts 22. Accordingly, as forming the first sub-parts 21 along the first direction X and forming the second sub-parts 22 along the second direction Y, not only the vertical light transmits, but also the horizontal light transmits, to reduce the light transmittance difference between the vertical direction and the horizontal direction of the touch touch display panel.

Figure 7A:
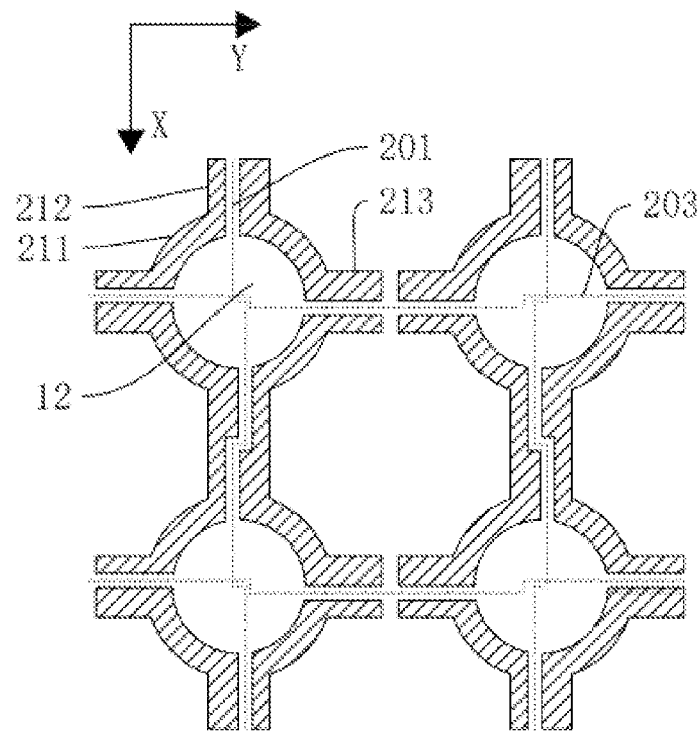
FIG. 7A is a partition structure diagram of another first wiring provided by an embodiment of the application.
Figure 7B:
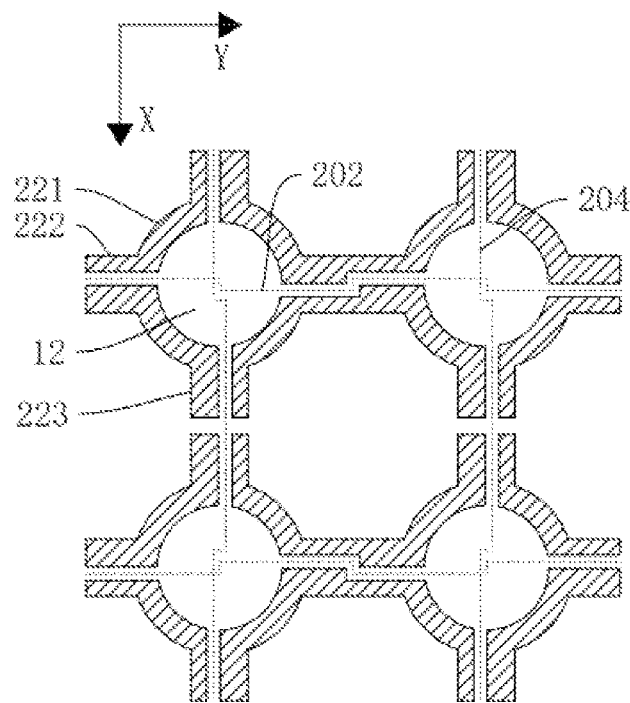
FIG. 7B is a partition structure diagram of another second wiring provided by an embodiment of the application.

Please refer to FIG. 1, FIG. 7A and FIG. 7B. In another embodiment of the present application, in the first sub-part 21 of this embodiment, the widths of the two first connecting sub-parts 212 connected to the same first wiring sub-parts 211 are different, and the widths of the two first connecting sub-parts 212 connected between two adjacent first wiring sub-parts 211 along the first direction X are different, so that the first partition channel 201 formed by the two adjacent first sub-parts 21 possesses a broken line shape, so as to improve the display uniformity of the display panel.

Furthermore, from left to right, between the first first sub-part 21 and the second first sub-part 21, the first wiring sub-part 211 of the first first sub-part 21 and the adjacent first wiring sub-part 211 are arranged around one light-emitting pixel 12; between the third first sub-part 21 and the fourth first sub-part 21, the first wiring sub-part 211 of the third first sub-part 21 and the adjacent first wiring sub-part 211 are arranged around one light-emitting pixel 12, thus, in the embodiment of the present application, the touch wires 20 are arranged in the display area AA, but the light emission of the light-emitting pixels 12 is not blocked, that is, the light extraction amount and light extraction effect of the display panel can be improved.

Besides, each first wiring sub-part 211 is provided with a first protruding structure 213 along the second direction Y. For example, between the second first sub-part 21 and the third first sub-part 21, each first wiring sub-part 211 in one of the first sub-parts 21 is provided with two first protruding structure 213 in the direction facing the adjacent other first sub-part 21, and the first protruding structure 213 on the second first sub-part 21 and the first protruding structure 213 on the third first sub-part 21 are spaced apart and disposed opposite to each other.

The widths of the two first protruding structures 213 connected to the same first wiring sub-part 211 and located on the same side are different, and the widths of the two first protruding structures 213 between the two adjacent first wiring sub-parts 211, which are disposed opposite to each other, are the same, and the widths of the sub-part 211, which are disposed oppositely, are different.

In this embodiment, each first wiring sub-part 211 is provided with a third partition channel 203 along the second direction Y. The third partition channel 203 is provided between the two first protruding structures 213 on the same side of the first wiring sub-part 211 to separate the first sub-part 21 into multiple sections arranged along the first direction X, to form a signal wiring connected to the touch electrode 11 and a virtual wiring spaced apart from the signal wiring in the touch wires 20. The virtual wiring and the signal wiring possess the same structure, and thus can have the same light transmission during the display process, so as to improve the uniformity of light transmission of the display panel in each touch wire 20 and improve the display uniformity of the display panel.

In the second sub-part 22 of this embodiment, the widths of the two second connecting sub-parts 222 connected to the same second wiring sub-parts 221 are different, and the widths of the two second connecting sub-parts 222 connected between two adjacent second wiring sub-parts 221 along the second direction Y are different, so that the second partition channel 202 formed by the two adjacent second sub-parts 22 possesses a broken line shape, so as to improve the display uniformity of the display panel.

Furthermore, from top to bottom, between the first second sub-part 22 and the second second sub-part 22, the second wiring sub-part 221 of the first second sub-part 22 and the adjacent second wiring sub-part 221 are arranged around one light-emitting pixel 12; between the third second sub-part 22 and the fourth second sub-part 22, the second wiring sub-part 221 of the third second sub-part 22 and the adjacent second wiring sub-part 221 are arranged around one light-emitting pixel 12, thus, in the embodiment of the present application, the touch wires 20 are arranged in the display area AA, but the light emission of the light-emitting pixels 12 is not blocked, that is, the light extraction amount and light extraction effect of the display panel can be improved.

Besides, each second wiring sub-part 221 is provided with a second protruding structure 223 along the second direction Y. For example, between the second second sub-part 22 and the third second sub-part 22, each second wiring sub-part 221 in one of the second sub-parts 22 is provided with two second protruding structure 223 in the direction facing the adjacent other second sub-part 22, and the second protruding structure 223 on the second second sub-part 22 and the second protruding structure 223 on the third second sub-part 22 are spaced apart and disposed opposite to each other.

The widths of the two second protruding structures 223 connected to the same second wiring sub-part 221 and located on the same side are different, and the widths of the two second protruding structures 223 between the two adjacent second wiring sub-parts 221, which are disposed opposite to each other, are the same, and the widths of the two second protruding structures 223 connected to opposite sides of the same second wiring sub-part 221, which are disposed oppositely, are different.

In this embodiment, each second wiring sub-part 221 is provided with a fourth partition channel 204 along the first direction X. The fourth partition channel 204 is provided between the two second protruding structures 223 on the same side of the second wiring sub-part 221 to separate the second sub-part 22 into multiple sections arranged along the second direction Y, to form a signal wiring connected to the touch electrode 11 and a virtual wiring spaced apart from the signal wiring in the touch wires 20. The virtual wiring and the signal wiring possess the same structure, and thus can have the same light transmission during the display process, so as to improve the uniformity of light transmission of the display panel in each touch wire 20 and improve the display uniformity of the display panel.

In addition, in this embodiment, a broken line-shaped first partition channel 201 may be formed between adjacent first sub-parts 21, and a broken line-shaped second partition channel 202 may be formed between adjacent second sub-parts 22. Accordingly, as forming the first sub-parts 21 along the first direction X and forming the second sub-parts 22 along the second direction Y, not only the vertical light transmits, but also the horizontal light transmits, to reduce the light transmittance difference between the vertical direction and the horizontal direction of the touch touch display panel.

Figure 8A:
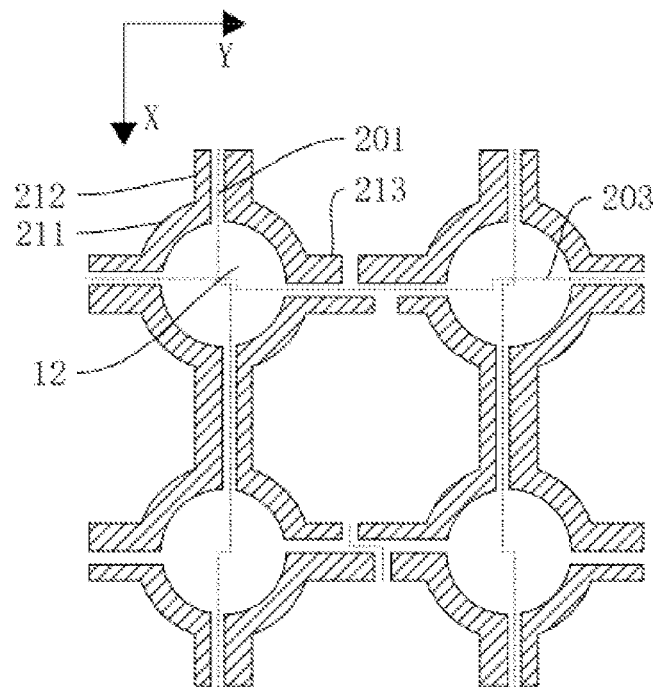
FIG. 8A is a partition structure diagram of one another first wiring provided by an embodiment of the application.
Figure 8B:
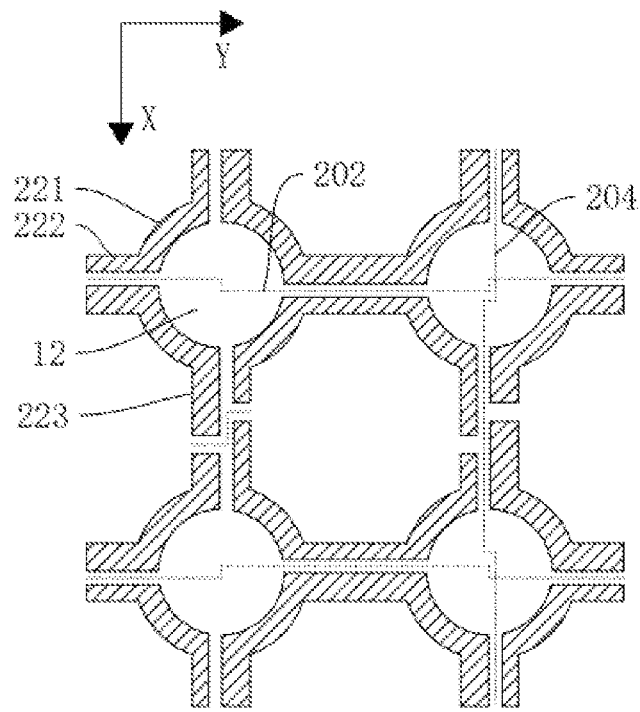
FIG. 8B is a partition structure diagram of one another second wiring provided by an embodiment of the application.

Please refer to FIG. 1, FIG. 8A and FIG. 8B. In another embodiment of the present application, in the first sub-part 21 of this embodiment, the widths of the two first connecting sub-parts 212 connected to the same first wiring sub-parts 211 are different, and the widths of the two first connecting sub-parts 212 connected between two adjacent first wiring sub-parts 211 along the first direction X are the same, so that the first partition channel 201 formed by the two adjacent first sub-parts 21 possesses a broken line shape, so as to improve the display uniformity of the display panel.

Furthermore, from left to right, between the first first sub-part 21 and the second first sub-part 21, the first wiring sub-part 211 of the first first sub-part 21 and the adjacent first wiring sub-part 211 are arranged around one light-emitting pixel 12; between the third first sub-part 21 and the fourth first sub-part 21, the first wiring sub-part 211 of the third first sub-part 21 and the adjacent first wiring sub-part 211 are arranged around one light-emitting pixel 12, thus, in the embodiment of the present application, the touch wires 20 are arranged in the display area AA, but the light emission of the light-emitting pixels 12 is not blocked, that is, the light extraction amount and light extraction effect of the display panel can be improved.

Besides, each first wiring sub-part 211 is provided with a first protruding structure 213 along the second direction Y. For example, between the second first sub-part 21 and the third first sub-part 21, each first wiring sub-part 211 in one of the first sub-parts 21 is provided with two first protruding structure 213 in the direction facing the adjacent other first sub-part 21, and the first protruding structure 213 on the second first sub-part 21 and the first protruding structure 213 on the third first sub-part 21 are spaced apart and disposed opposite to each other.

The widths of the two first protruding structures 213 connected to the same first wiring sub-part 211 and located on the same side are different, and the widths of the two first protruding structures 213 between the two adjacent first wiring sub-parts 211, which are disposed opposite to each other, are the same, and the widths of the sub-part 211, which are disposed oppositely, are different. The lengths of the two first protruding structures 213 connected to the same side of the first wiring sub-part 211 are different. The length of the first protruding structure 213 connected to the second first sub-part 21 and the length of the first protruding structure 213 connected to the third first sub-part 21, which are disposed opposite to each other, are different.

In this embodiment, each first wiring sub-part 211 is provided with a third partition channel 203 along the second direction Y. The third partition channel 203 is provided between the two first protruding structures 213 on the same side of the first wiring sub-part 211 to separate the first sub-part 21 into multiple sections arranged along the first direction X, to form a signal wiring connected to the touch electrode 11 and a virtual wiring spaced apart from the signal wiring in the touch wires 20. The virtual wiring and the signal wiring possess the same structure, and thus can have the same light transmission during the display process, so as to improve the uniformity of light transmission of the display panel in each touch wire 20 and improve the display uniformity of the display panel.

In the second sub-part 22 of this embodiment, the widths of the two second connecting sub-parts 222 connected to the same second wiring sub-parts 221 are different, and the widths of the two second connecting sub-parts 222 connected between two adjacent second wiring sub-parts 221 along the second direction Y are the same, so that the second partition channel 202 formed by the two adjacent second sub-parts 22 possesses a broken line shape, so as to improve the display uniformity of the display panel.

Furthermore, from top to bottom, between the first second sub-part 22 and the second second sub-part 22, the second wiring sub-part 221 of the first second sub-part 22 and the adjacent second wiring sub-part 221 are arranged around one light-emitting pixel 12; between the third second sub-part 22 and the fourth second sub-part 22, the second wiring sub-part 221 of the third second sub-part 22 and the adjacent second wiring sub-part 221 are arranged around one light-emitting pixel 12, thus, in the embodiment of the present application, the touch wires 20 are arranged in the display area AA, but the light emission of the light-emitting pixels 12 is not blocked, that is, the light extraction amount and light extraction effect of the display panel can be improved.

Besides, each second wiring sub-part 221 is provided with a second protruding structure 223 along the second direction Y. For example, between the second second sub-part 22 and the third second sub-part 22, each second wiring sub-part 221 in one of the second sub-parts 22 is provided with two second protruding structure 223 in the direction facing the adjacent other second sub-part 22, and the second protruding structure 223 on the second second sub-part 22 and the second protruding structure 223 on the third second sub-part 22 are spaced apart and disposed opposite to each other.

The widths of the two second protruding structures 223 connected to the same second wiring sub-part 221 and located on the same side are different, and the widths of the two second protruding structures 223 between the two adjacent second wiring sub-parts 221, which are disposed opposite to each other, are the same, and the widths of the two second protruding structures 223 connected to opposite sides of the same second wiring sub-part 221, which are disposed oppositely, are different. The lengths of the two second protruding structures 223 connected to the same side of the second wiring sub-part 221 are different. The length of the second protruding structure 223 connected to the second second sub-part 22 and the length of the second protruding structure 223 connected to the third second sub-part 22, which are disposed opposite to each other, are different.

In this embodiment, each second wiring sub-part 221 is provided with a fourth partition channel 204 along the first direction X. The fourth partition channel 204 is provided between the two second protruding structures 223 on the same side of the second wiring sub-part 221 to separate the second sub-part 22 into multiple sections arranged along the second direction Y, to form a signal wiring connected to the touch electrode 11 and a virtual wiring spaced apart from the signal wiring in the touch wires 20. The virtual wiring and the signal wiring possess the same structure, and thus can have the same light transmission during the display process, so as to improve the uniformity of light transmission of the display panel in each touch wire 20 and improve the display uniformity of the display panel.

In addition, in this embodiment, a broken line-shaped first partition channel 201 may be formed between adjacent first sub-parts 21, and a broken line-shaped second partition channel 202 may be formed between adjacent second sub-parts 22. Accordingly, as forming the first sub-parts 21 along the first direction X and forming the second sub-parts 22 along the second direction Y, not only the vertical light transmits, but also the horizontal light transmits, to reduce the light transmittance difference between the vertical direction and the horizontal direction of the touch display panel when the touch wires 20 are patterned, thereby effectively improving the phenomenon of uneven display of the touch display panel and the display effect of the touch display panel.

Figure 9A:
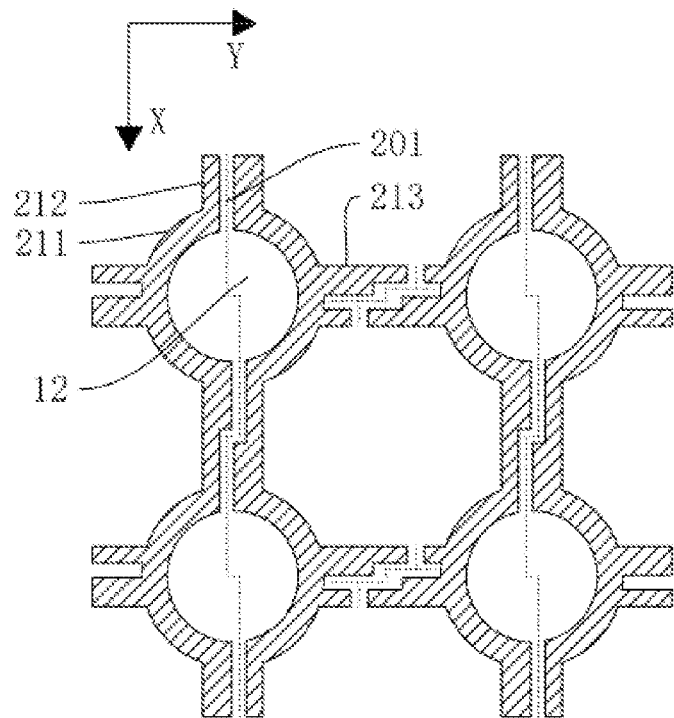
FIG. 9A is a partition structure diagram of another first wiring provided by an embodiment of the application.
Figure 9B:
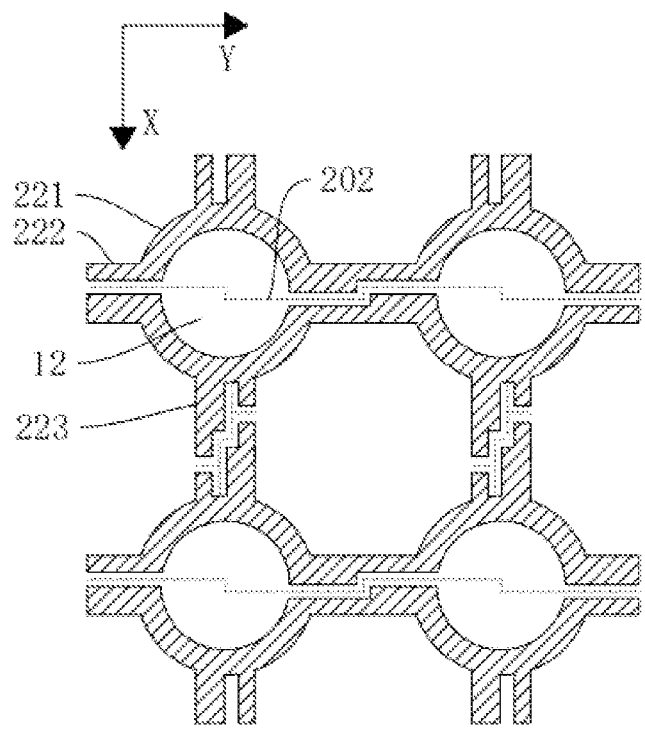
FIG. 9B is a partition structure diagram of another second wiring provided by an embodiment of the application.

Please refer to FIG. 1, FIG. 9A and FIG. 9B. In another embodiment of the present application, in the first sub-part 21 of this embodiment, the widths of the two first connecting sub-parts 212 connected to the same first wiring sub-parts 211 are different, and the widths of the two first connecting sub-parts 212 connected between two adjacent first wiring sub-parts 211 along the first direction X are different, so that the first partition channel 201 formed by the two adjacent first sub-parts 21 possesses a broken line shape, so as to improve the display uniformity of the display panel.

Furthermore, from left to right, between the first first sub-part 21 and the second first sub-part 21, the first wiring sub-part 211 of the first first sub-part 21 and the adjacent first wiring sub-part 211 are arranged around one light-emitting pixel 12; between the third first sub-part 21 and the fourth first sub-part 21, the first wiring sub-part 211 of the third first sub-part 21 and the adjacent first wiring sub-part 211 are arranged around one light-emitting pixel 12, thus, in the embodiment of the present application, the touch wires 20 are arranged in the display area AA, but the light emission of the light-emitting pixels 12 is not blocked, that is, the light extraction amount and light extraction effect of the display panel can be improved.

Besides, each first wiring sub-part 211 is provided with a first protruding structure 213 along the second direction Y. For example, between the second first sub-part 21 and the third first sub-part 21, each first wiring sub-part 211 in one of the first sub-parts 21 is provided with two first protruding structure 213 in the direction facing the adjacent other first sub-part 21, and the first protruding structure 213 on the second first sub-part 21 and the first protruding structure 213 on the third first sub-part 21 are spaced apart and disposed opposite to each other.

The widths of the two first protruding structures 213 connected to the same first wiring sub-part 211 and located on the same side are different, and the widths of the two first protruding structures 213 between the two adjacent first wiring sub-parts 211, which are disposed opposite to each other, are different, and the widths of the two first protruding structures 213 connected to opposite sides of the same first wiring sub-part 211, which are disposed oppositely, are different. The lengths of the two first protruding structures 213 connected to the same side of the first wiring sub-part 211 are different. The length of the first protruding structure 213 connected to the second first sub-part 21 and the length of the first protruding structure 213 connected to the third first sub-part 21, which are disposed opposite to each other, are different.

Furthermore, in the first protruding structure 213 connected to the left side of the second first sub-part 21, the width of part of the first protruding structure 213 may not be consistent. For instance, the width of the side close to the first wiring sub-part 211 connected thereto is greater than the width of the side far away from the first wiring sub-part 211.

In the second sub-part 22 of this embodiment, the widths of the two second connecting sub-parts 222 connected to the same second wiring sub-parts 221 are different, and the widths of the two second connecting sub-parts 222 connected between two adjacent second wiring sub-parts 221 along the second direction Y are different, so that the second partition channel 202 formed by the two adjacent second sub-parts 22 possesses a broken line shape, so as to improve the display uniformity of the display panel.

Furthermore, from top to bottom, between the first second sub-part 22 and the second second sub-part 22, the second wiring sub-part 221 of the first second sub-part 22 and the adjacent second wiring sub-part 221 are arranged around one light-emitting pixel 12; between the third second sub-part 22 and the fourth second sub-part 22, the second wiring sub-part 221 of the third second sub-part 22 and the adjacent second wiring sub-part 221 are arranged around one light-emitting pixel 12, thus, in the embodiment of the present application, the touch wires 20 are arranged in the display area AA, but the light emission of the light-emitting pixels 12 is not blocked, that is, the light extraction amount and light extraction effect of the display panel can be improved.

Besides, each second wiring sub-part 221 is provided with a second protruding structure 223 along the second direction Y. For example, between the second second sub-part 22 and the third second sub-part 22, each second wiring sub-part 221 in one of the second sub-parts 22 is provided with two second protruding structure 223 in the direction facing the adjacent other second sub-part 22, and the second protruding structure 223 on the second second sub-part 22 and the second protruding structure 223 on the third second sub-part 22 are spaced apart and disposed opposite to each other.

The widths of the two second protruding structures 223 connected to the same second wiring sub-part 221 and located on the same side are different, and the widths of the two second protruding structures 223 between the two adjacent second wiring sub-parts 221, which are disposed opposite to each other, are the same, and the widths of the two second protruding structures 223 connected to opposite sides of the same second wiring sub-part 221, which are disposed oppositely, are different. The lengths of the two second protruding structures 223 connected to the same side of the second wiring sub-part 221 are different. The length of the second protruding structure 223 connected to the second second sub-part 22 and the length of the second protruding structure 223 connected to the third second sub-part 22, which are disposed opposite to each other, are different.

Furthermore, in the second protruding structure 223 connected to the lower side of the second second sub-part 22, the width of part of the second protruding structure 223 may not be consistent. For instance, the width of the side close to the second wiring sub-part 221 connected thereto is greater than the width of the side far away from the second wiring sub-part 221.

In addition, in this embodiment, a broken line-shaped first partition channel 201 may be formed between adjacent first sub-parts 21, and a broken line-shaped second partition channel 202 may be formed between adjacent second sub-parts 22. Accordingly, as forming the first sub-parts 21 along the first direction X and forming the second sub-parts 22 along the second direction Y, not only the vertical light transmits, but also the horizontal light transmits, to reduce the light transmittance difference between the vertical direction and the horizontal direction of the touch display panel when the touch wires 20 are patterned, thereby effectively improving the phenomenon of uneven display of the touch display panel and the display effect of the touch display panel.

Besides, the embodiment of the present application further provides a display device, which comprises the display panel in the foregoing embodiments.

In the foregoing embodiments, the description of the various embodiments have respective different emphases, and a part in some embodiment, which is not described in detail can be referred to the related description of other embodiments.

The touch display panel and display device provided by the embodiments of the present application is described in detail as aforementioned, and the principles and implementations of the present application have been described with reference to specific illustrations. The description of the foregoing embodiments is merely for helping to understand the technical solutions of the present application and the core ideas thereof; those skilled in the art should understand that the technical solutions described in the foregoing embodiments may be modified, or some of the technical features may be equivalently replaced; and the modifications or replacements do not deviate from the spirit and scope of the technical solutions of the embodiments of the present application.

What is claimed is:

1. A touch display panel, comprising a display area and a non-display area, wherein the touch display panel further comprises:
   a substrate;
   a light-emitting layer arranged on a side of the substrate and comprising a plurality of light-emitting pixels arranged in the display area;
   a touch layer comprising a plurality of touch electrodes arranged in the display area and a plurality of touch wires arranged corresponding to the touch electrodes;
   wherein the touch wire comprises a first sub-part arranged along a first direction and a second sub-part arranged along a second direction, the first direction is different from the second direction;
   the first sub-part comprises: a plurality of first wiring sub-parts arranged on a side of the light-emitting pixel along the first direction, and a plurality of first connecting sub-parts connecting the adjacent first wiring sub-parts, and widths of the two first connecting sub-parts connected to one of the first wiring sub-parts are different, and/or widths of the two first connecting sub-parts connected between two adjacent first wiring sub-parts are different;
   the second sub-part comprises: a plurality of second wiring sub-parts arranged on a side of the light-emitting pixel along the second direction, and a plurality of second connecting sub-parts connecting the adjacent second wiring sub-parts, and widths of the two second connecting sub-parts connected to one of the second wiring sub-parts are different, and/or widths of the two second connecting sub-parts connected between two adjacent second wiring sub-parts are different;
   a broken line-shaped first partition channel is formed between the adjacent first sub-parts, and a broken line-shaped second partition channel is formed between the adjacent second sub-parts.

2. The touch display panel according to claim 1, wherein in the two adjacent first sub-parts, the first wiring sub-part in one of the first sub-parts and the adjacent first wiring sub-part in the other of the first sub-parts are arranged around the same light-emitting pixel, and widths of the first connecting sub-part in one of the first sub-parts and the adjacent first connecting sub-part in the other of the first sub-parts are different.

3. The touch display panel according to claim 1, wherein the first wiring sub-part in one of the first sub-parts is provided with at least two first protruding structures in a direction facing the adjacent first wiring sub-part in the other of the first sub-parts, and widths of two adjacent first protruding structures are different; lengths of the two first protruding structures connected to the same side of the first wiring sub-part are different.

4. The touch display panel according to claim 1, wherein the first wiring sub-part in one of the first sub-parts is provided with at least two first protruding structures in a direction facing the adjacent first wiring sub-part in the other of the first sub-parts, and widths of two adjacent first protruding structures are different a length of the first protruding structure connected to one of the first wiring sub-parts and a length of the first protruding structure connected to the other of the first wiring sub-parts, which are disposed opposite to each other, are different.

5. The touch display panel according to claim 2, wherein in the two adjacent first sub-parts, a width of the first wiring sub-part in one of the first sub-parts is the same as a width of the adjacent first wiring sub-part in the other of the first sub-parts.

6. The touch display panel according to claim 1, wherein in the two adjacent second sub-parts, the second wiring sub-part in one of the second sub-parts and the adjacent second wiring sub-part in the other of the second sub-parts are arranged around the same light-emitting pixel, and widths of the second connecting sub-part in one of the second sub-parts and the adjacent second connecting sub-part in the other of the second sub-parts are different.

7. The touch display panel according to claim 1, wherein the second wiring sub-part in one of the second sub-parts is provided with at least two second protruding structure in a direction facing the adjacent second wiring sub-part in the other of the second sub-parts, and widths of two adjacent second protruding structures are different lengths of the two second protruding structures connected to the same side of the second wiring sub-part are different.

8. The touch display panel according to claim 1, wherein the second wiring sub-part in one of the second sub-parts is provided with at least two second protruding structure in a direction facing the adjacent second wiring sub-part in the other of the second sub-parts, and widths of two adjacent second protruding structures are different a length of the second protruding structure connected to one of the second wiring sub-part and a length of the second protruding structure connected to the other of the second wiring sub-parts, which are disposed opposite to each other, are different.

9. The touch display panel according to claim 6, wherein in the two adjacent second sub-parts, a width of the second wiring sub-part in one of the second sub-parts is the same as a width of the adjacent second wiring sub-part in the other of the second sub-parts.

10. The touch display panel according to claim 1, wherein the plurality of touch wires comprise: a first touch wire, a second touch wire and a third touch wire that are adjacently aligned in sequence;
the first wiring sub-part in the second touch wire and the adjacent first wiring sub-part in the first touch wire are arranged around the same light-emitting pixel, and the first wiring sub-part in the second touch wire is provided with at least two first protruding structures in a direction facing the adjacent first wiring sub-part in the third touch wire;
the second wiring sub-part in the second touch wire and the adjacent second wiring sub-part in the first touch wire are arranged around the same light-emitting pixel, and the second wiring sub-part in the second touch wire is provided with at least two second protruding structure in a direction facing the adjacent second wiring sub-part in the third touch wire.

11. A display device, wherein the display device comprises a touch display panel, and the touch display panel comprises a display area and a non-display area, and the touch display panel further comprises:
a substrate;
a light-emitting layer arranged on a side of the substrate and comprising a plurality of light-emitting pixels arranged in the display area;
a touch layer comprising a plurality of touch electrodes arranged in the display area and a plurality of touch wires arranged corresponding to the touch electrodes;
wherein the touch wire comprises a first sub-part arranged along a first direction and a second sub-part arranged along a second direction, the first direction is different from the second direction;
the first sub-part comprises: a plurality of first wiring sub-parts arranged on a side of the light-emitting pixel along the first direction, and a plurality of first connecting sub-parts connecting the adjacent first wiring sub-parts, and widths of the two first connecting sub-parts connected to one of the first wiring sub-parts are different, and/or widths of the two first connecting sub-parts connected between two adjacent first wiring sub-parts are different;
the second sub-part comprises: a plurality of second wiring sub-parts arranged on a side of the light-emitting pixel along the second direction, and a plurality of second connecting sub-parts connecting the adjacent second wiring sub-parts, and widths of the two second connecting sub-parts connected to one of the second wiring sub-parts are different, and/or widths of the two second connecting sub-parts connected between two adjacent second wiring sub-parts are different;
a broken line-shaped first partition channel is formed between the adjacent first sub-parts, and a broken line-shaped second partition channel is formed between the adjacent second sub-parts.

12. The touch display device according to claim 11, wherein in the two adjacent first sub-parts, the first wiring sub-part in one of the first sub-parts and the adjacent first wiring sub-part in the other of the first sub-parts are arranged around the same light-emitting pixel, and widths of the first connecting sub-part in one of the first sub-parts and the adjacent first connecting sub-part in the other of the first sub-parts are different.

13. The touch display device according to claim 11, wherein the first wiring sub-part in one of the first sub-parts is provided with at least two first protruding structures in a direction facing the adjacent first wiring sub-part in the other of the first sub-parts, and widths of two adjacent first protruding structures are different lengths of the two first protruding structures connected to the same side of the first wiring sub-part are different.

14. The touch display device according to claim 11, wherein the first wiring sub-part in one of the first sub-parts is provided with at least two first protruding structures in a direction facing the adjacent first wiring sub-part in the other of the first sub-parts, and widths of two adjacent first protruding structures are different; a length of the first protruding structure connected to one of the first wiring sub-parts and a length of the first protruding structure connected to the other of the first wiring sub-parts, which are disposed opposite to each other, are different.

15. The touch display device according to claim 12, wherein in the two adjacent first sub-parts, a width of the first wiring sub-part in one of the first sub-parts is the same as a width of the adjacent first wiring sub-part in the other of the first sub-parts.

16. The touch display device according to claim 11, wherein in the two adjacent second sub-parts, the second wiring sub-part in one of the second sub-parts and the adjacent second wiring sub-part in the other of the second sub-parts are arranged around the same light-emitting pixel, and widths of the second connecting sub-part in one of the second sub-parts and the adjacent second connecting sub-part in the other of the second sub-parts are different.

17. The touch display device according to claim 11, wherein the second wiring sub-part in one of the second sub-parts is provided with at least two second protruding structure in a direction facing the adjacent second wiring sub-part in the other of the second sub-parts, and widths of two adjacent second protruding structures are different lengths of the two second protruding structures connected to the same side of the second wiring sub-part are different.

18. The touch display device according to claim 11, wherein the second wiring sub-part in one of the second sub-parts is provided with at least two second protruding structure in a direction facing the adjacent second wiring sub-part in the other of the second sub-parts, and widths of two adjacent second protruding structures are different a length of the second protruding structure connected to one of the second wiring sub-part and a length of the second protruding structure connected to the other of the second wiring sub-parts, which are disposed opposite to each other, are different.

19. The touch display device according to claim 16, wherein in the two adjacent second sub-parts, a width of the second wiring sub-part in one of the second sub-parts is the same as a width of the adjacent second wiring sub-part in the other of the second sub-parts.

20. The touch display device according to claim 11, wherein the plurality of touch wires comprise: a first touch wire, a second touch wire and a third touch wire that are adjacently aligned in sequence;
  the first wiring sub-part in the second touch wire and the adjacent first wiring sub-part in the first touch wire are arranged around the same light-emitting pixel, and the first wiring sub-part in the second touch wire is provided with at least two first protruding structures in a direction facing the adjacent first wiring sub-part in the third touch wire;
  the second wiring sub-part in the second touch wire and the adjacent second wiring sub-part in the first touch wire are arranged around the same light-emitting pixel, and the second wiring sub-part in the second touch wire is provided with at least two second protruding structure in a direction facing the adjacent second wiring sub-part in the third touch wire.

* * * * *